Sept. 5, 1950 H. C. ELLIS 2,521,054

CENTRIFUGAL EXTRACTOR

Filed Jan. 22, 1945 11 Sheets-Sheet 1

Inventor
Hubert C. Ellis
By: Fred Gerlach
Atty's

Inventor
Hubert C. Ellis
By: Fred Gerlach Atty.

Inventor
Hubert C. Ellis
By: Fred Gerlach
Atty.

Sept. 5, 1950 H. C. ELLIS 2,521,054

CENTRIFUGAL EXTRACTOR

Filed Jan. 22, 1945 11 Sheets-Sheet 4

Inventor
Hubert C. Ellis
By Fred Gerlach atty.

Sept. 5, 1950 H. C. ELLIS 2,521,054

CENTRIFUGAL EXTRACTOR

Filed Jan. 22, 1945 11 Sheets-Sheet 5

Inventor
Hubert C. Ellis
By Fred Gerlach
Atty.

Sept. 5, 1950 H. C. ELLIS 2,521,054

CENTRIFUGAL EXTRACTOR

Filed Jan. 22, 1945 11 Sheets-Sheet 6

Inventor
Hubert C. Ellis
By: Fred Gerlach atty.

Sept. 5, 1950 H. C. ELLIS 2,521,054

CENTRIFUGAL EXTRACTOR

Filed Jan. 22, 1945 11 Sheets-Sheet 7

Inventor
Hubert C. Ellis
By: Fred Gerlach
Atty

Sept. 5, 1950 | H. C. ELLIS | 2,521,054

CENTRIFUGAL EXTRACTOR

Filed Jan. 22, 1945 | 11 Sheets-Sheet 8

Inventor
Hubert C. Ellis
By: Fred Gerlach atty.

CENTRIFUGAL EXTRACTOR

Inventor:-
Hubert C. Ellis
By Fred Gerlach
Atty.

CENTRIFUGAL EXTRACTOR

Filed Jan. 22, 1945 11 Sheets-Sheet 10

Inventor
Hubert C. Ellis
By Fred Gerlach Atty

CENTRIFUGAL EXTRACTOR

Inventor
Hubert Ellis.
By Fred Gerlach
atty.

Patented Sept. 5, 1950

2,521,054

UNITED STATES PATENT OFFICE 2,521,054

CENTRIFUGAL EXTRACTOR

Hubert C. Ellis, Evanston, Ill., assignor to The Ellis Drier Co., Chicago, Ill., a corporation of Illinois Application January 22, 1945, Serial No. 573,996

18 Claims. (Cl. 210—63)

This invention relates in general to a centrifugal extractor for wet clothes and is more particularly described as a pneumatically and electrically controlled and operated extracting and drying apparatus.

An important object of the invention is to provide a commercial drier or extractor in which certain of the apparatus is controlled pneumatically and in which there is also electrical driving and operating apparatus with pneumatic controls.

A further object of the invention is to provide an extractor and drier of the class described in which a cycle of operations, both electrical and pneumatic are completed for each run of the machine.

A further object of the invention is to provide a drier and extractor for wet clothes in which the apparatus is controlled and operated by a combined electrical and pneumatic system and arrangement of parts to cover a complete cycle of operations of the apparatus.

A still further object of the invention is to provide a centrifugal extractor having electrical and pneumatic parts which operate automatically to complete a predetermined cycle of operations from the time wet clothes are deposited in the machines until they are delivered in a dried condition ready for the next batch.

Other objects of the invention are in the provision of improved switches both electrical and pneumatic, in improved brake structure, in a simplified pneumatic cover control and in improved automatically operated parts for effecting the predetermined operation of the apparatus.

A further object of the invention is in providing combined electrical and pneumatic extractor apparatus which is effective and efficient in operation.

Another object of the invention is to provide a drier or extractor having combined electrical and pneumatic controlling and operating parts which are generally of new and improved construction characterized by simplicity of design as well as ease and facility of assembly and operation.

Other objects of the invention and various advantages and characteristics of the present combined electrical and pneumatic extractor will be apparent from a consideration of the following detailed description.

The invention consists in the several novel features of construction and in the system of operation which are hereinafter described and more particularly defined by the claims at the conclusion thereof.

In the drawings which accompany and form a part of this specification or disclosure, and in which like letters and numerals of reference denote corresponding parts throughout the several views, Figure 1 is a side elevation of an extractor constructed in accordance with this invention;

Figure 1:
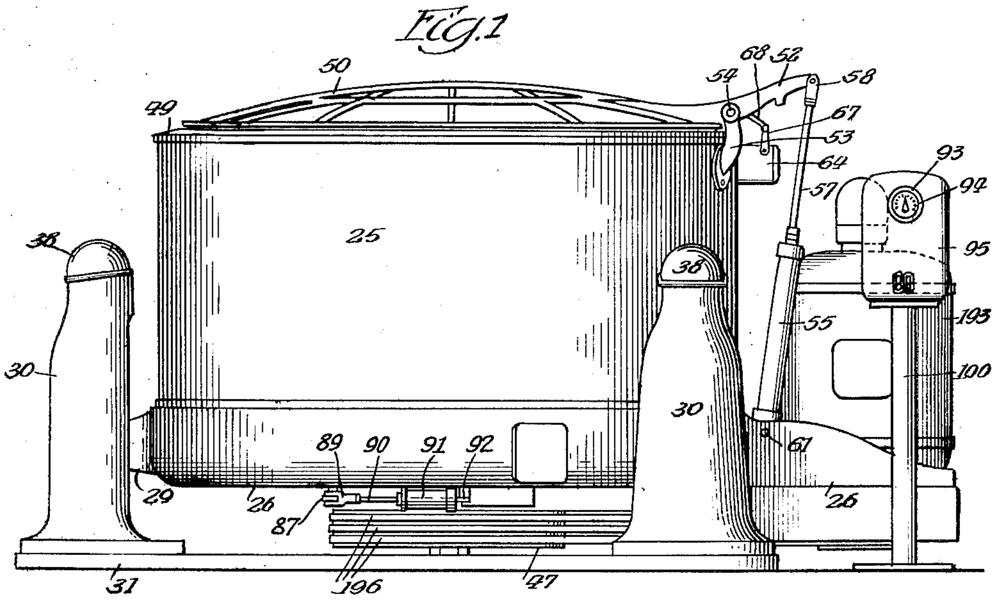
Figure 2:
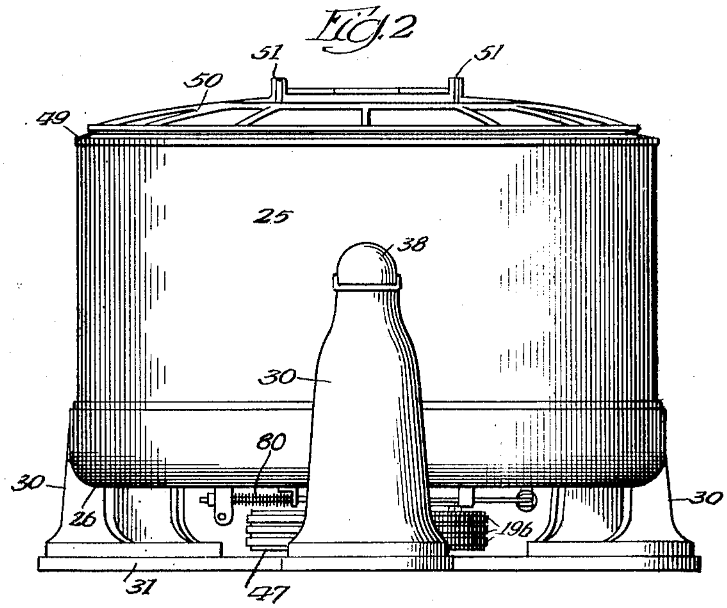
Figure 2 is an end elevation taken at right angles to the view in Figure 1.
Figure 3:
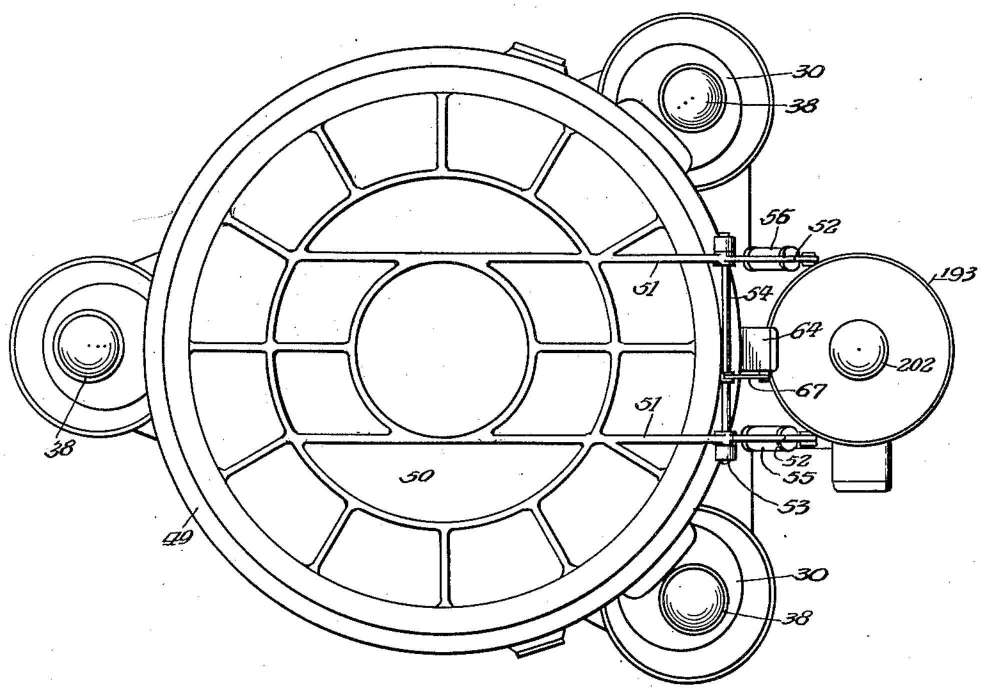
Figure 3 is a top view of the machine shown in Figure 1.
Figure 4:
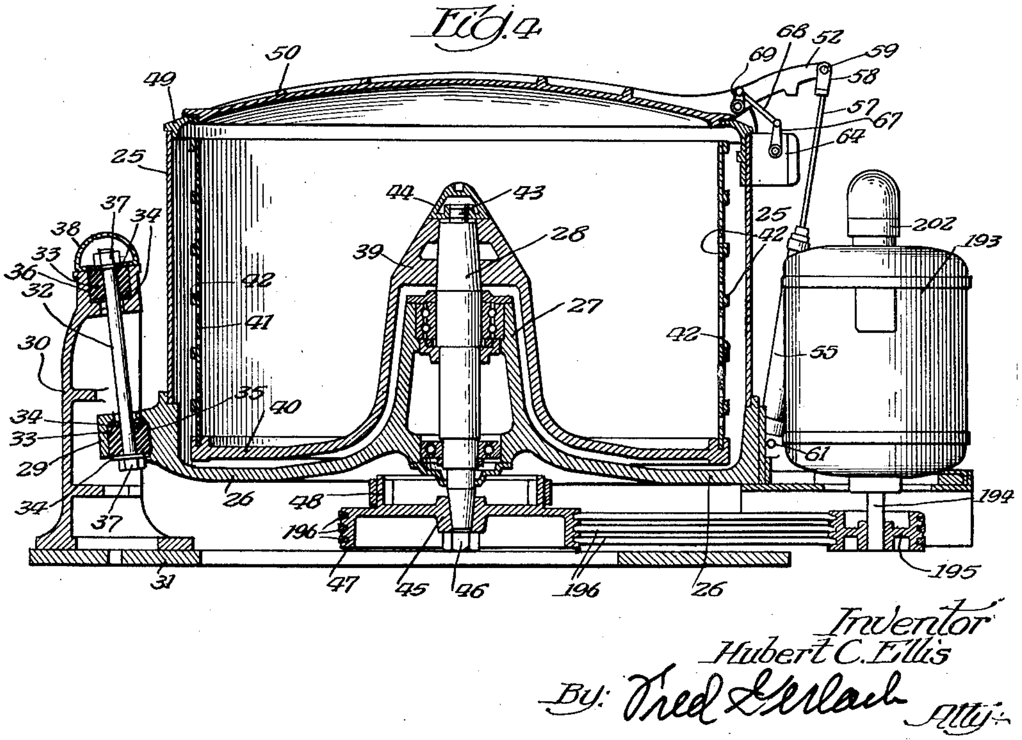
Figure 4 is a sectional view of the structure shown in Figure 3.
Figures 5, 6:
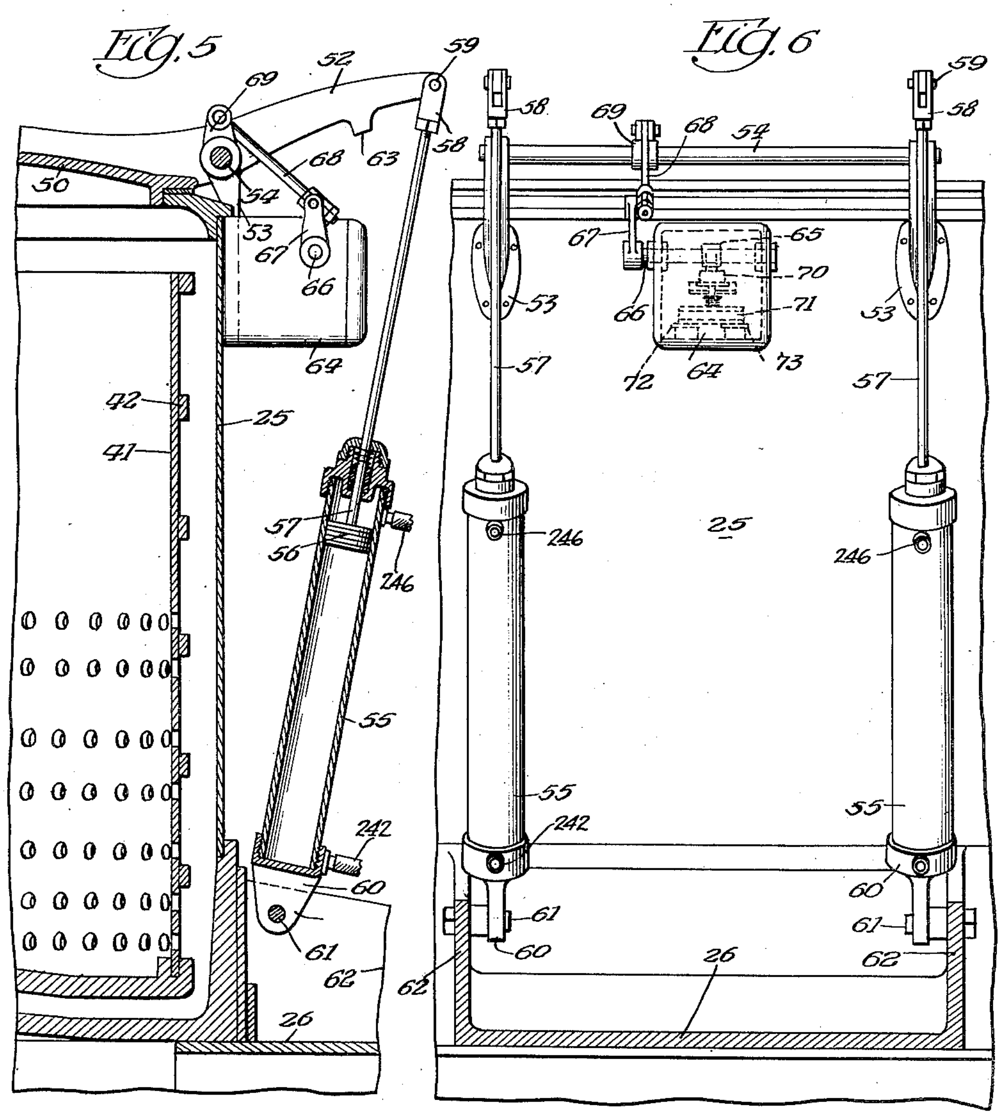
Figure 5 is a sectional detail of the cover operating means.
Figure 6 is an elevational detail of the cover operating means shown in part in Figure 5.
Figure 7:
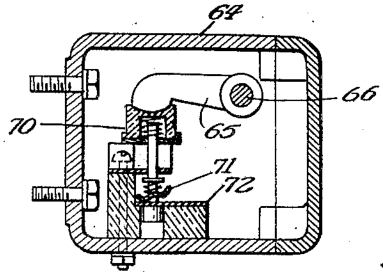
Figure 7 is a detail view of the cover switch.

At the start of a cycle of operations, the machine is stopped, the brake is released, the motor is off and the cover is open. An operator lowers a load of clothing into the extractor basket and arranges them in a balanced relation by turning the free basket and distributing the load if it appears necessary. The machine is now ready for a run. The operator sets the timer located at the top of the control station panel for a run of any desired length, then raises two control levers located just below the timer. The machine is now set to go through its complete cycle automatically and the operator is free to do other work for the duration of the run. The cycle of operation is as follows: First the cover closes; then the motor starts and continues to run for the length of time set by the timer. When this time has expired, the motor circuit is cut off and the brake is applied until the basket comes to a full stop. The cover is then opened and the brake is released freeing the basket. The extractor is now ready for unloading and for another cycle of operations.

Referring now more particularly to the drawings, the extractor comprises an outer casing 25 supported at the bottom by a base 26 having an upwardly projecting center 27 providing a bearing for a vertical mounting shaft 28. Extending at spaced intervals from the outer edge of the base are supporting projections 29 disposed somewhat within and below the upper ends of supporting pedestals 30 which have a firm mounting upon a floor 31 or any other suitable support for the extractor.

Extending between each projection 29 and the upper end of each pedestal 30 is a supporting bar 32 with a resilient rubber-like buffer 33 at each end enclosed between washers 34 surrounding the bar. The buffer and the washer at the lower end of the bar is seated in a recess 35 at the under side of the projection 29 and the buffer and the washers at the upper end of the bar are seated in a recess 36 opening from the upper end of the pedestal, the buffers and washers being tightened on the ends of the bar by nuts 37 and the bar extending loosely through openings in the bottoms of the recesses. Covering the nut at the top of the pedestal, is a removable cap 38. Thus the entire base of the extractor is resiliently supported to take up any vibration which may be imparted to the extractor by its motor and the rapid rotation of the extractor basket.

Within the casing, the upper end of shaft 28 projects above the bearing in the upwardly projecting center 27, providing a slightly beveled seat for a central projection 39 of the base 40 of the extractor basket which has an outer perforated cylindrical wall 41 and strengthening outer rims 42. The upper end 43 of the shaft is reduced in size and threaded and a removable cap 44 is secured thereto holding the basket in place on the shaft.

At the lower end of the driving shaft 28 which is suitably mounted in bearings in the projection 27 of the base is a drum 45 secured to the beveled extremity of the shaft by a nut 46 threaded on the end of the shaft. This drum has a grooved driving portion 47 and a projecting brake flange 48.

At the top of the casing 25 is a rim 49 and a cover 50. The rim is tightly secured to the casing 25 and the cover has parallel ribs 51 extending partially over the top and terminating in projections 52 at one side of the cover. The cover is pivotally mounted on brackets 53 secured to the upper edge of the casing and projecting above the casing to receive a hinging bar 54 which extends through the brackets and through the rib projections 52 so that the cover may be raised and lowered about the bar 54 as a center.

In order to raise and lower the cover, fluid pressure operating means are provided comprising a cylinder 55 for each of the arm projections 52 having a piston 56 movable in the cylinder, and the piston rod 57 extending therefrom through a packing gland in the outer end of the cylinder and having a terminal piece 58 at the outer end connected by a pivot 59 to the outer end of the arm projection 52. The lower end of the cylinder is closed by a fitting 60 having a projecting ear for connecting it to a pivot 61 extending through a rib 62 of the supporting base. When fluid under pressure is admitted to the cylinders at the upper ends of their pistons, the cover will be raised and when fluid under pressure is admitted at the bottom of the cylinders, the cover will be closed. In opening, the movement of the cover is limited by the engagement of projections 63 at the under side of the rib extensions 52 with the under side of the cover brackets 53.

A cover switch 64 is secured to the upper edge of the casing 25 between the mounting brackets 53 and comprises a casing in which a switch operating arm 65 is mounted upon a transverse shaft 66 extending across the casing and through one side thereof. At the outer end of the shaft is an arm 67 pivotally connected to one end of a link 68, the other end of which has a pivotal connection with an arm 69 secured to the cover operating shaft 54. The connection of the parts is such that when the cover is raised, the switch arm 65 is raised and when the cover is closed, the switch arm 65 engages a push button 70 which carries a contactor plate 71 for electrically connecting two contacts 72 and 73.

Figure 8:
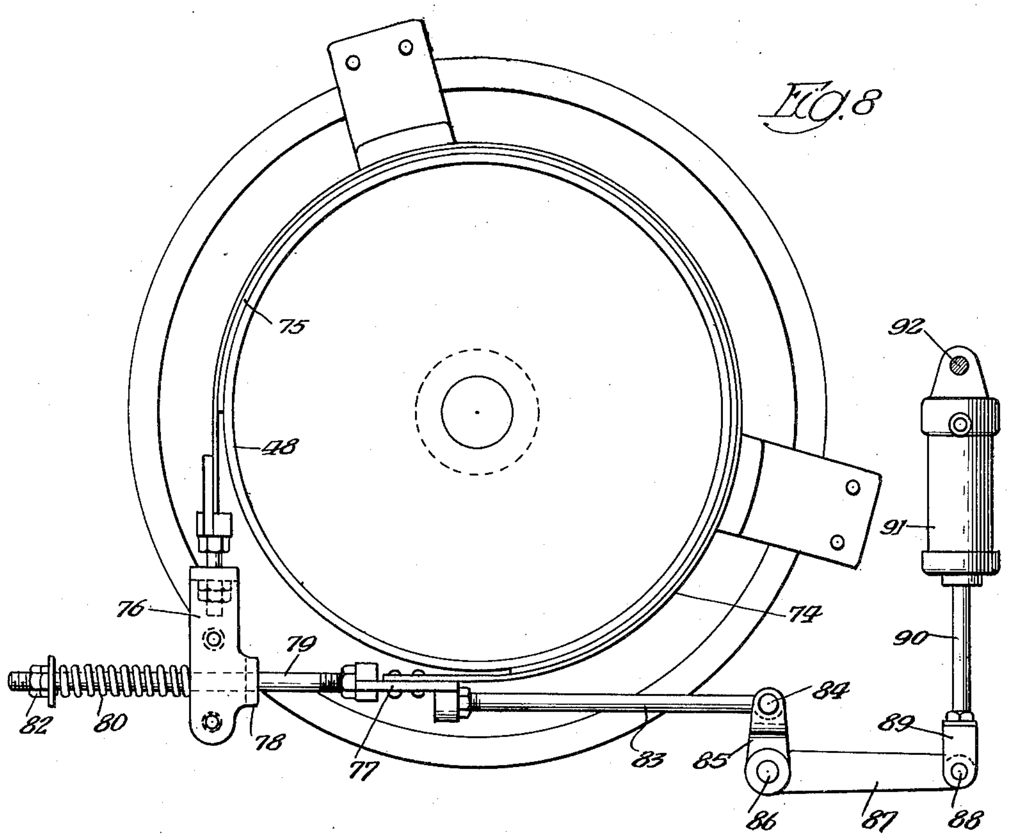
Figure 8 is a plan view of the braking operating mechanism.
Figure 9:
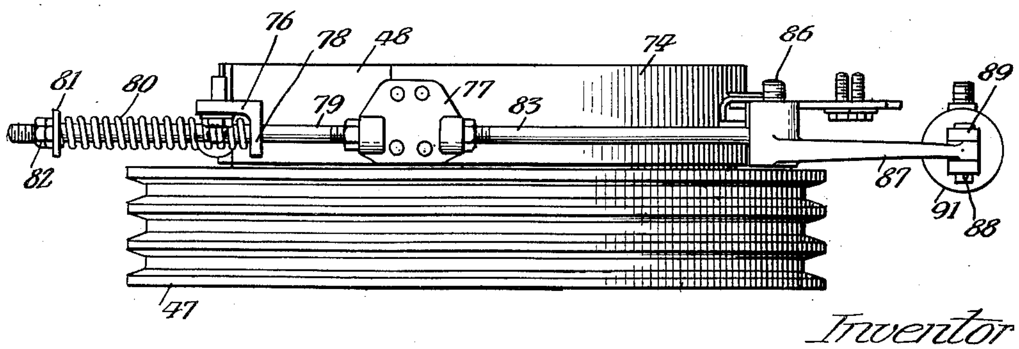
Figure 9 is an elevational view of the brake mechanism shown in Figure 8.

For engaging the brake drum flange 48 as shown more clearly in Figures 8 and 9, a brake band 74 having a brake shoe or contact band 75 partially surrounds the brake flange and has end connectors 76 and 77 for applying the brake to stop the rotation of the shaft 28 and the carrier basket attached thereto. One of the end fittings 76 has a perforated ear 78 through which extends a bar 79 connected to the other end fitting 77. On the opposite end of the bar is a coil spring 80 confined between the ear 78 and a washer 81 held on the end of the shaft by means of a fastening nut 82 tending to wrap the brake band 74 around the flange 48, thus applying the brake.

Connected to the other end of the fitting 77 is an operating bar 83. The free end of the bar has a pivot 84 connecting it to one arm 85 of a bell crank mounted on a fixed pivot 86 and having an opposite operating arm 87. The free end of the operating arm is connected by a pivot 88 to a fitting 89 at one end of a piston rod 90 which extends into one end of a brake cylinder 91 mounted on a pivot 92 at its other end projecting from base 26. When pressure is applied to the brake cylinder 91 to move the piston rod outwardly, the arms 87 and 85 of the bell crank are moved to draw the bar 83 in a direction to release the brake by compressing the spring 80 and correspondingly loosening the brake band upon the brake drum flange 48. When pressure is released from the brake cylinder, the spring 80 presses the brake end fitting 76 and 77 together, applies the brake, and moves the bar 83 in a reverse direction, correspondingly moving the piston and the piston rod 90 in the brake cylinder.

Figures 10, 11, 11A, 11B:
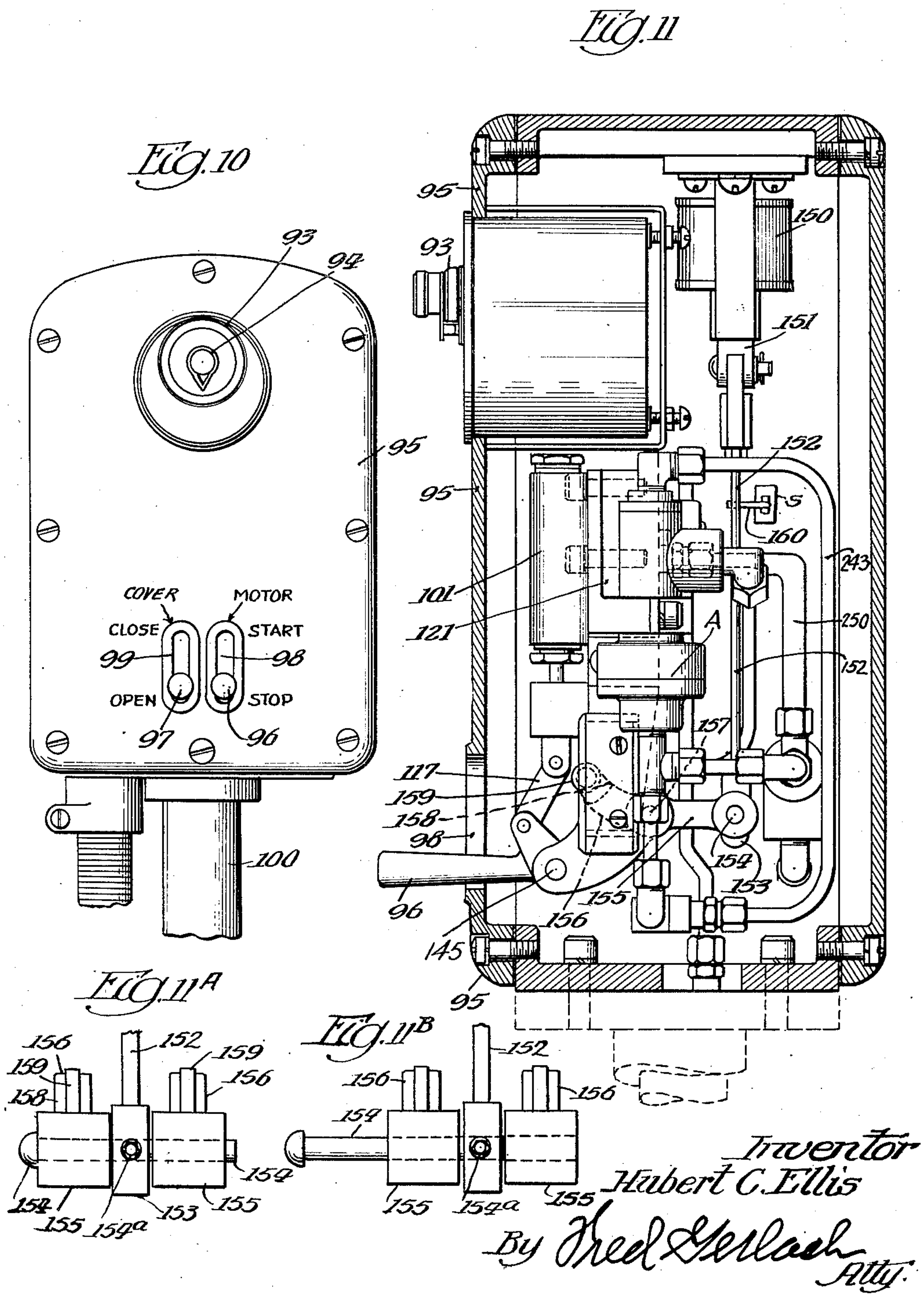
Figure 10 is an elevation of the timer and control panel.
Figure 11 is a sectional view of the control panel shown in Figure 10.
Figures 11A and 11B are detail views of a solenoid tripper pin.
Figure 12:
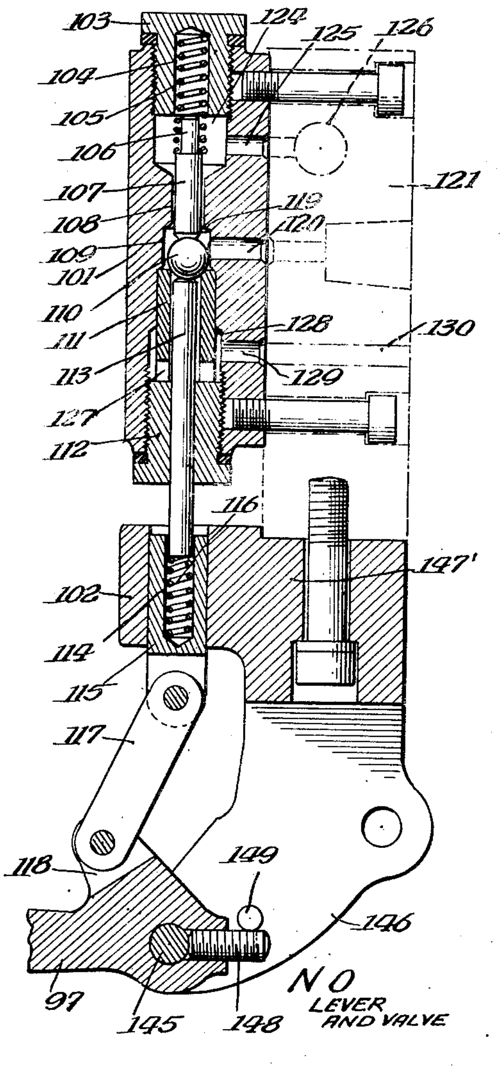
Figure 12 is a sectional view of the left control lever and the valves which it operates.

A timer and control panel is shown more clearly in Figure 10 and comprises a timing device 93 of any suitable construction, having an operating knob 94 which may be set for different time intervals. This timer is set into a panel 95 which forms the front of a housing for containing right and left operating levers 96 and 97 which project through slots 98 and 99 respectively at the bottom of the panel. This control panel is commonly mounted upon a hollow standard or post 100 adjacent to the extractor. One of these levers 97 controls a normally open valve structure as shown in Figure 12, to control the operation of the cover 50 by means of the cylinders 55, and it is designated as the NO lever, and the valve which it operates as the NO valve. The other or right hand lever 96 controls a normally closed valve structure for controlling the supply of current to an electrical driving motor, and it is therefore designated as the NC lever and the NC valve as shown more clearly in Figure 13.

The normally open valve structure as shown in Figure 12 comprises a barrel fitting 101 and a guide 102 below it attached to a connection block 121 suitably supported in the panel 95. An upper packing gland 103 has an internal recess 104 for receiving one end of a spring 105, the other end of which engages a reduced portion 106 of a stem 107 extending loosely through a passage 108 connected with a ball recess 109 and containing a ball 110. The ball is seated at the upper end of a hollow sleeve 111 above a packing gland 112 inserted at the lower end of the barrel 101. A thrust stem 113 moves freely in the gland and bears at its upper end against the ball 110 and its lower end extends through the gland 112 and into the guide 102 where it enters a bore 114 of a fitting 115 slidable in the guide, being cushioned therein by a spring 116 seated in the bore and tending to press the thrust stem upwardly.

The lower end of the fitting 115 is connected by a link 117 with an ear 118 projecting from the lever 97 and when the lever 97 is moved upwardly, the ball 110 is raised resiliently from its seat at the upper end of sleeve 111 and is pressed against a valve seat 119 at the upper end of the ball recess 109. The ball recess 109 has a passage 120 extending therefrom into the panel block 121 from which it is connected by means of a pipe 122 with one end of a diaphragm valve B.

At the upper end of stem 107 is a chamber 124 having a passage 125 extending therefrom and connected through block 121 with a fluid pressure supply pipe 126.

At the bottom of sleeve 111 and between it and the attached or adjacent gland portion 112 are openings 127 communicating with a surrounding chamber 128 connected by a passage 129 to and through the block 121 to a pressure discharge or vent opening 130.

Figure 13:
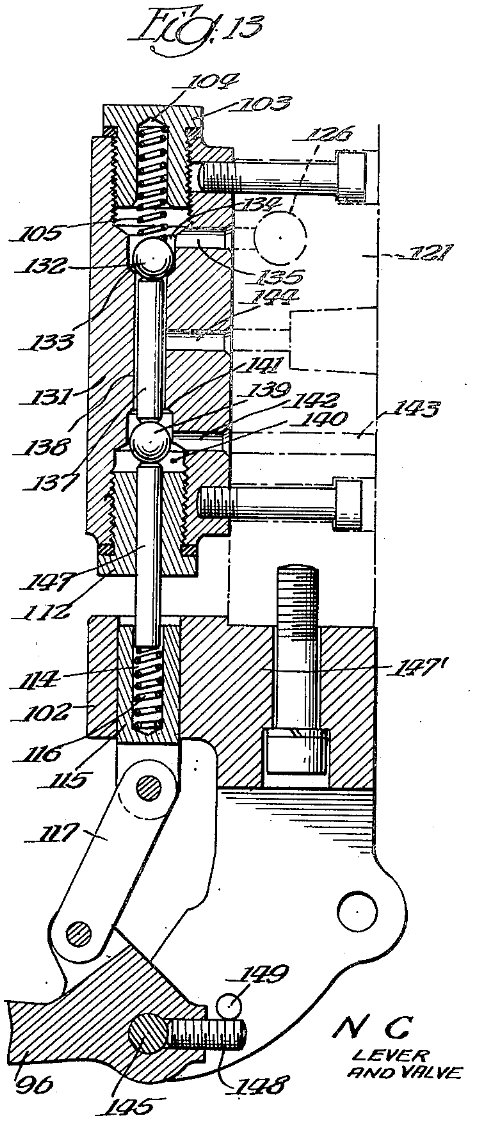
Figure 13 is a sectional view of the right control lever and the valve which it operates.

The normally closed valve NC is similar in structure and operation to the normally open valve NO; it is shown in detail in Figure 13 and it is connected to the same attachment block 121. It comprises a barrel fitting 131 having an upper packing gland 103 with a recess 104 for seating one end of a spring 105 the other end of which engages a ball 132 tending to seat it on a valve seat 133. The ball is movable upwardly against the spring pressure in a chamber 134 connected to a passage 135 and thence through the block 121 with the air supply pipe 126. A thrust stem 137 is loosely mounted in a barrel passage 138 to engage the ball 132 at one end and to engage a valve ball 139 at the other end. This latter ball is movable in a chamber 140 and is adapted to be closed upon a valve seat 141 at the lower end of the barrel passage 138 oppositely in direction to the closing of the ball 132. Extending from this chamber 140 is a passage 142 which extends through a vent passage 143 in the block 121.

Intermediate the ball valves and their seats and intermediate the passages 135 and 142 is a passage 144 communicating with the barrel passage 138 and leading through the block 121 which is connected through intermediate piping with another diaphragm valve A.

To operate the ball valves 132 and 139, a thrust stem 147 extends through the lower mounting gland 112 and into the bore 114 of fitting 115 slidable in the guide 102 of the normally closed lever 96 which is connected for operation of the fitting by means of a link 117. The movement of the thrust stem 147 is cushioned by its engagement with one end of a spring 116 seated in the bore 114.

Thus it will be seen that the normally open lever 97 has a ball valve for allowing pressure to flow from the upper passage 125 through passage 108 and through the passage 120 when the lever 97 is in its lowered position; and when the lever is raised, ball 110 is closed on seat 119, and a relief connection is established between passage 120 and vent passage 129 through the hollow sleeve 111, openings 127 and chamber 128. Likewise, when lever 96 is in its lower position, the upper ball 132 is closed upon its seat 133 and a vent connection is established from passage 144 through the bore 138 past the valve ball 139 and its chamber 140 to the vent passage 142; when the lever is raised, the lower valve ball is closed upon its seat 141, the upper ball 132 is raised from its seat 133, and a pressure connection is established between passage 135 into the chamber 134 past the valve seat 133 and bore 138 into the passage 144.

Each of the valve levers 96 and 97 is mounted upon a pivot 145 in a support 146 extending below the guide 102 which is secured to mounting block 121 by fastening screws 147'. The pivotal mounting of each lever is adjusted by a stud 148 which projects oppositely from the lever and provides means for engaging a fixed stop 149, carried by the support 146 and thus limiting the downward movement of each of the levers.

The normal position of both levers 96 and 97 is in the downward or outwardly projecting position as shown in Figures 10 and 11, and when raised, the parts controlled by the lever are maintained in their upward or raised position because the pivotal connection between the link 117 and the lever ear 118 is moved across the center line between the lever pivot 145 and the connection of the upper end of link 117 with the fitting 115. Some means is therefore necessary to move the links and levers outwardly in order to return them to their lowered position. The means provided for this purpose comprises a solenoid at the top of the control box at the rear of the panel 95 having a winding 150 for attracting and raising an armature 151 when the solenoid is energized. The armature is connected at the upper end of a vertically movable rod 152 having a perforated fitting 153 at the lower end as shown more clearly in Figures 11A and 11B. The fitting is connected at each side thereof with an arm 155 of an operating member 156 by means of a common pivot 154, both arms being mounted on a common pivot 157. One operating member 156 for each of the levers 96 and 97 is arranged adjacent and in line with the link 117 of the corresponding lever, each comprising an upward projection 158 having a roller 159 carried by the projection and adapted to be engaged by its corresponding link 117 when its lever 96 or 97 is operatively raised to thereby contact the roller end of the lever 156 and actuate the connected rod 152 moving it downwardly, and the reverse movement of the rod actuating the members 156 to press the link forwardly when the rod 152 is raised by the solenoid 150. Thus the levers 96 and 97 are electrically moved to deflect the connecting links 117 past their operating center line so that the springs 105 and 116 will then return the levers to their lowered position. The solenoid tripper for the levers 96 and 97 thus comprises the vertically movable trip rod 152 as also shown in Figures 11A and 11B in which the pivot pin 154 which connects fitting 153 at the end of the trip rod 152 extends through arms 155 of the two lever operating members 156, one on each side of the rod. When this pivot pin 154 is arranged so that it extends through both of the arms 155 as shown in Figure 11A, the normally open valve NO which controls the operation of the cover is tripped by the solenoid and the cover will open automatically as hereafter explained. When the pivot pin is partially withdrawn so that only one of the operating members 156 is engaged thereby, as illustrated in Figure 11B, the operating member 156 is not moved, the operating lever 97 for the cover valve NO is not tripped and it is necessary to actuate the lever 97 manually when it is desired to open the cover by the operation of the cover controlling valve.

This adjustment is easily made from the back of the panel housing, and if desired, an additional set screw similar to 154*a* may be provided in connection with either one or both of the arms 155 for engaging the pin 154 and holding it in either adjusted position.

In the operation of the solenoid, a normally open micro-switch S is operated by a projection 160 attached to the rod 152 or some other part moved by the solenoid, the switch being closed by the upward movement of levers 96 and 97 and opened by the solenoid, the connection being such as illustrated in the wiring diagram that the opening micro-switch breaks the solenoid energizing circuit so that the solenoid is only momentarily energized. When the solenoid is energized, it opens the micro-switch and also trips both valve levers 96 and 97 as above described, to a down position allowing the valves controlled thereby to return to their downward positions.

Figure 14:
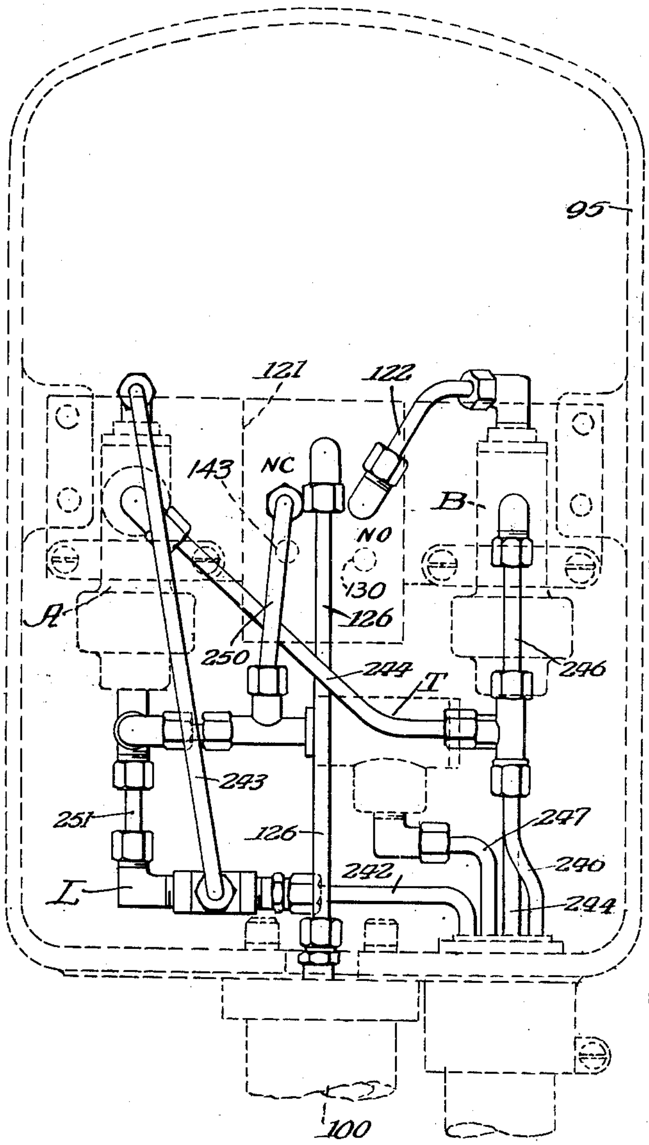
Figure 14 is a rear elevation of the pipe connections of the control panel.
Figure 15:
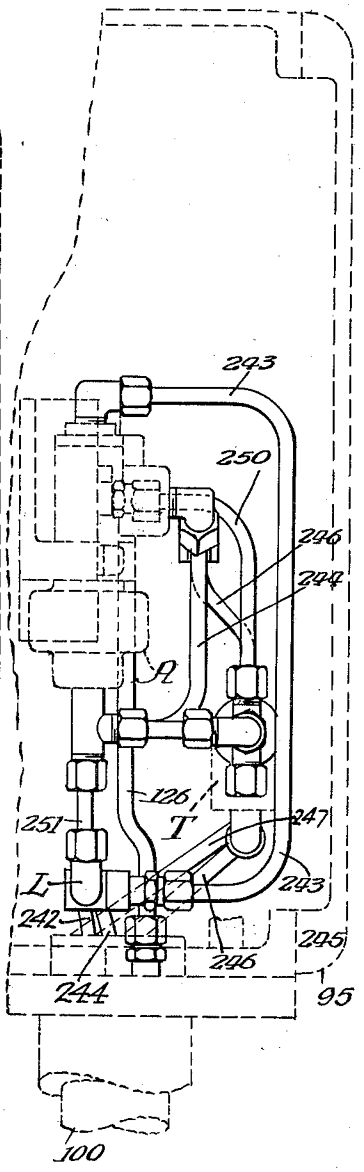
Figure 15 is a side elevation of the piping shown in Figure 14.
Figure 18:
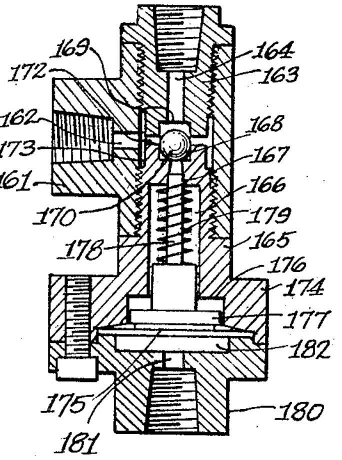
Figure 18 is a detail sectional view of one of the diaphragm valves.

Each of the valves operated by levers 96 and 97 is connected to a diaphragm valve A and B respectively as shown more clearly in Figure 18. This valve comprises a three-way fitting 161 having an internally threaded side connected passage 162, an end fitting 163 with an internally threaded passage 164 and an opposite end fitting 165 with an internal chamber 166 and a reduced end passage 167. These two end fittings 163 and 165 each have an end recess 168 together forming a chamber 169 for a valve ball 170. The inner extremities of these two fittings 163 and 165 terminate short of each other within the sleeve member 161 forming a circular passage 172 connected with an outer chamber 173 which leads directly to the passage 162. At the outer end of the end member 165 is an enlarged head 174 recessed at the end to provide a seat for a diaphragm 175 therein and a recess 176 inwardly from the diaphragm for seating a headed plunger 177 therein, the head of the plunger engaging the diaphragm and the reduced portion of the plunger being freely movable in the internal chamber 166, and having a reduced stem 178 adapted to project into the end passage 167 and to engage the valve ball 170 therein to press it from the seat at the end of the fitting 165, and to press it against the seat at the end of fitting 163. In the chamber 166 surrounding the stem 178 is a spring 179 which bears at one end upon the headed member 177 and at the other end upon the end of the chamber, thereby tending to urge the valve operating stem out of contact with the valve ball 170 and tending to press the diaphragm 175 outwardly. The diaphragm is maintained in position in the head 174 by the outer marginal engagement therewith of a clamping member 180 which has a threaded passage 181 extending to a chamber 182 at the outer side of the diaphragm so that when pressure is applied through this passage 181, the diaphragm is deflected sufficiently against the pressure of spring 179 to press the valve ball 170 away from its seat and to close the passage 164 of the opposite end member 163. Figure 18 shows the valve with no inward pressure on the diaphragm 175. This is the condition represented in Figures 20, 21 and 23 at diaphragm valve A, and in Figures 21 and 22 at diaphragm valve B, as hereinafter described. The piping connections of the diaphragm valves A and B are also shown in Figures 11, 14 and 15, as hereinafter set forth.

Figure 19:
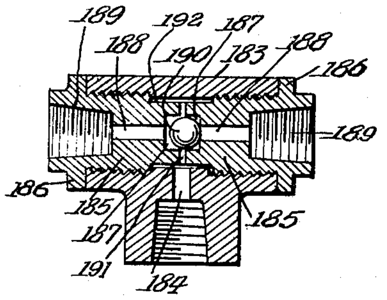
Figure 19 is a detail sectional view of a double check valve assembly.

A double check valve assembly is shown in Figure 19 somewhat similar to a portion of the diaphragm valve assembly. It comprises a three-way or T-fitting 183 having a lateral passage 184 and opposite internally threaded end passages. Two similar end members 185 are inserted one at each end of the fitting 183, each member having an externally threaded portion with a shoulder 186 to engage one outer end of the fitting 183, limiting its insertion therein. At the inner end of each fitting is a recess 187 having a central reduced passage 188 communicating therethrough with an outer internally threaded portion 189, the two inner recesses 187 forming a chamber for receiving a valve ball 190 adapted to move loosely in the recess under pressure applied to one end passage 188 to seal the other of the end passages 188, depending upon the direction pressure is applied to the fitting. The inner ends of the members 185 terminate short of each other to provide a space 191 communicating with an outer circular recess 192 between the ends of the members 185 and the inner surface of the fitting 183 and communicating at one side thereof with the lateral passage 184. With this construction, the valve ball will seat against either one of the end passages 188 due to pressure applied to the fitting and thus connecting the other end passage with the lateral passage 184.

This three-way check valve is connected for operation as shown more clearly in Figures 20 to 24 where it is designated as the valve T and connected at opposite ends to pipes 248 and 249 which are sometimes under pressure and sometimes connected to exhaust, the central or downwardly extending passage being connected by pipe 247 to the brake cylinder 91 for controlling pressure and exhaust thereto as hereafter and more fully described in connection with the operation of the system.

The normally open valve NO has a passage 125 at the top connected through block 121 with the fluid pressure supply pipe 126, and the passage 120 which extends from the fitting 101 is connected by means of a pipe 122 with the lower end opening 164 of the diaphragm valve B as shown in Figures 20 to 23. Likewise, the normally closed valve NC receives pressure from the pressure supply pipe 126, and a passage 144 communicating with the passage 138 in the barrel 131 is connected by a pipe 250 with the upper passage 181 of diaphragm valve A as shown in Figures 20 to 23. The three-way check valve T is connected by pipe 249 with the pipe 250 of diaphragm valve A and by the pipe 248 which is connected to a pipe 246 extending between the side connected passage 162 of diaphragm valve B and the top of the cover cylinder 55 as shown in Figures 20 to 23. The building operation of these parts is described hereafter in the detail operation of the system.

A driving motor 193 is suitably mounted upon extractor base 26 at one side of the casing 25 with its shaft 194 extending vertically, the lower end of the shaft having a driving pulley 195 connected thereto and the outer face of the pulley having grooves for receiving a plurality of driving belts 196 which extend around corresponding grooves of the driving drum 45.

Figure 16:
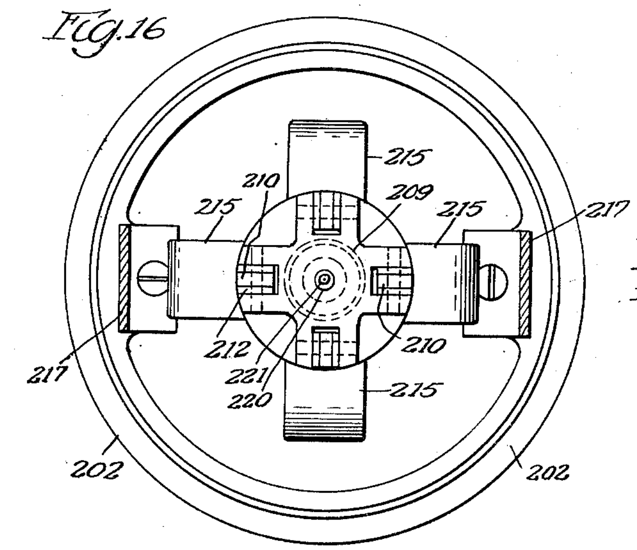
Figure 16 is a top view of the motor valve with the cover removed.
Figure 17:
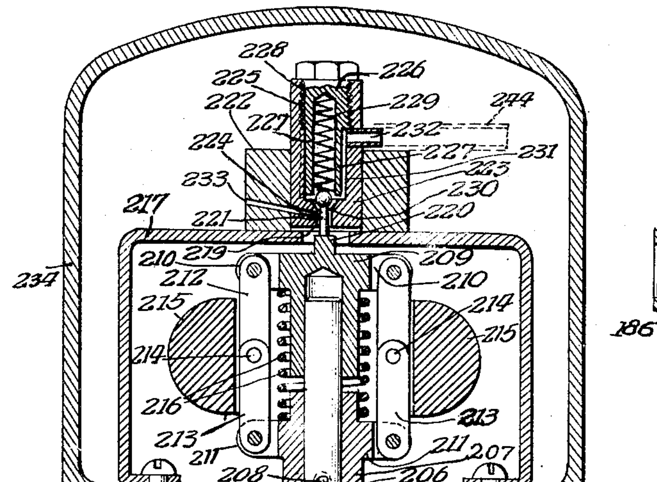
Figure 17 is a sectional view of the motor valve with the cover in place.

The upper end of motor shaft 194 is connected to a vent valve controller as shown more clearly in Figures 16 and 17. A coupling member 197 is threaded or otherwise secured to the upper end of motor shaft 194 and has a driving slot 198 engaged by a tongue 199 of a coupling member 200. A smaller shaft 201 is threaded into the coupling member 200 and projects through a mounting base 202 fixed at the upper end of motor 193 and having anti-friction bearings 203 in the base 202 for rotatably mounting the shaft 201 therein.

At the bottom of the lower bearings is a removable plate 204 held in place by screws 205 for retaining a part of the lower upper bearing in place, and at the top of the bearing is a shoulder 206 on the shaft 201 for retaining a part of the upper bearing in place. The object of this construction is to maintain shaft 201 in a fixed vertical position, but to permit a limited longitudinal movement of the motor shaft 194 with respect thereto. A speed governor operated by the driving motor 193 is mounted on the upper end of shaft 201 and comprises a lower member 207 fixed to the shaft against shoulder 206 by a pin 208 and an upper member 209 longitudinally movable upon the upper end of the shaft.

Extending from the upper and lower members are ears 210 and 211 respectively between which are pivoting links 212 and 213 respectively, the links being arranged in pairs and each pair of links 212 and 213 having a common pivot 214 joining them and carrying a fly ball or weight 215. Also extending between the two members with the ends engaging the ears thereof and surrounding the shaft is a coil spring 216, held in place by hub extensions of the upper and lower members 209 and 207 and tending to separate the members and to keep the fly balls or weights in their innermost positions.

Mounted in the base 202 is a yoke 217, secured at opposite ends by fastening screws 218, which extends above the top of the upper member 209. It is provided with an opening 219 to loosely receive an upward projection 220 of the upper governor member from which extends a reduced stem 221.

Secured to the upper side of the yoke by means of a block 222 is a valve body 223 having a bottom bore 224 into which the stem 221 extends and having a larger bore 225 opening from the upper end of the body for receiving a threaded valve cap 226 which has a stem 227 projecting nearly to the bottom of the recess when the cap is inserted in the valve body with a hollow bore 228 extending inwardly from the end thereof for seating a coil spring 229 therein adapted to press a valve ball 230 against the upper edge of the bore 224 which forms a valve seat therefor. The inner end of the stem portion 227 beyond the threaded portion of the valve cap fits loosely within the bore 225 to provide a chamber 231 which also continues over the end of the stem 227 and this chamber is controlled by the ball valve. A pressure inlet 232 is connected through the valve body in communication with the chamber 231 and extending from the reduced bore 224 below the valve ball is an outlet or vent passage 233.

The principal object of the vent valve or motor valve which is controlled by the speed governor is to insure that the driving motor speed has been reduced to a predetermined minimum before the cover operating cylinders 55 are vented at their bottoms to insure that the driving motor is practically at a standstill before the cover 50 is automatically opened by pressure applied to said cylinders.

The outward movement of the governor balls when the speed of the motor is sufficient to throw them outwardly, draws the upper member 209 and its stem 221 downwardly free from contact with the ball valve 230 allowing it to be closed by its spring 229. When the speed of the motor reaches a predetermined minimum, the member 209 is raised by its spring 216 correspondingly raising stem 221, engaging ball 230, raising it from its seat and, as pointed out in connection with the complete operation as described in connection with Figures 20 to 24, venting pressure or relief of pressure from the bottoms of cover operating cylinder 55 through a tubular path later traced which includes pipe 232 through chamber 231, bore 224, and vent outlet 233. Extending from the base 202 of the speed governor and extending over the top of the mechanism mounted thereon is an enclosing casing 234 which may be of glass, metal, plastic, or any other suitable material, the connection (not shown) to the pressure pipe 232 (pipe 244) being preferably below the casing 234 and through the base.

*Pipe connections*

Figures 22, 23:
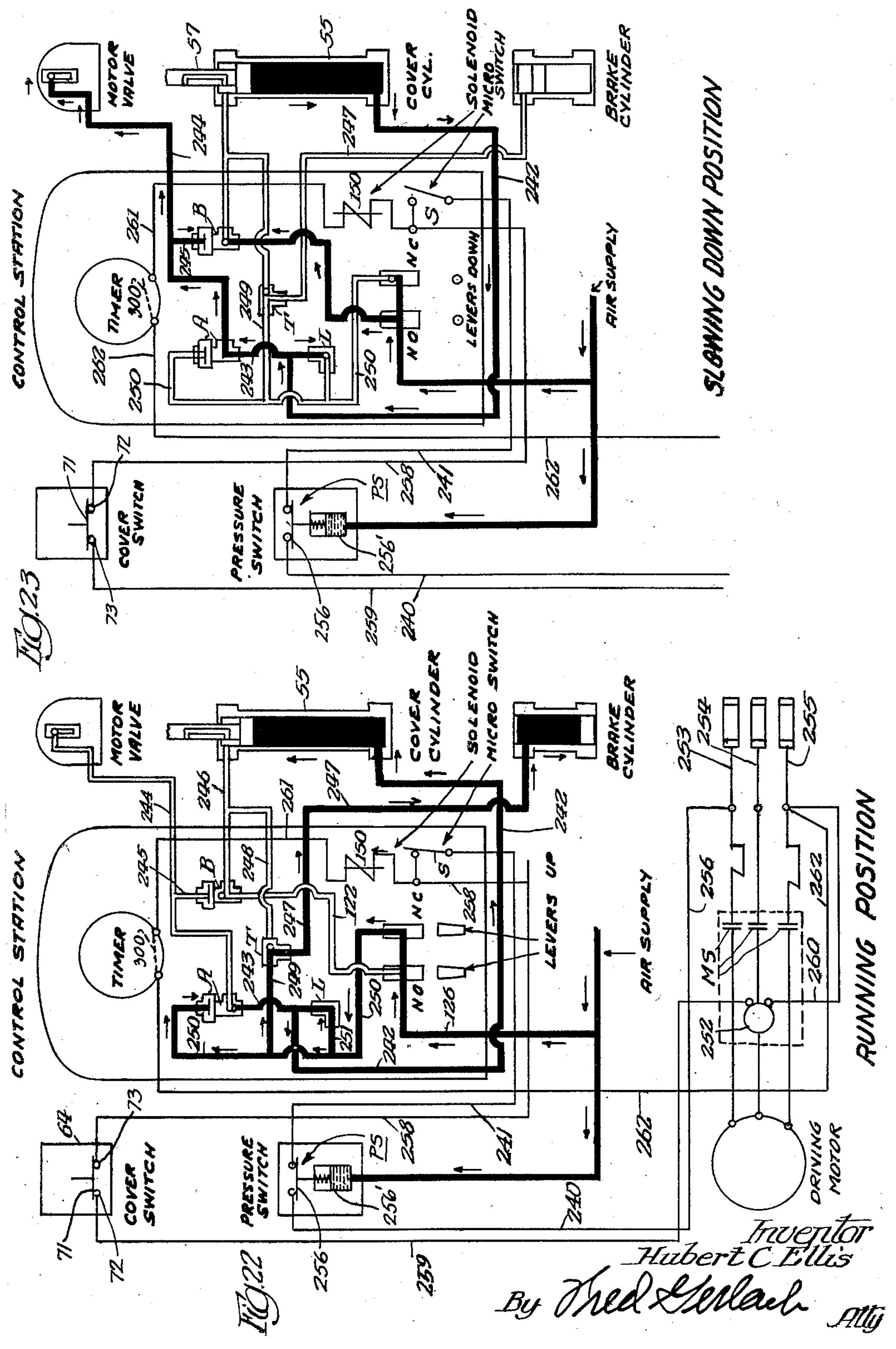
Figure 22 is a diagrammatic view of the electrical and operating parts when the extractor is running.
Figure 23 is a diagrammatic view showing the condition of the electrical and pneumatic parts when the apparatus is slowing down prior to the stopping position.

Referring more particularly to Figures 14, 15 and Figures 20 to 23, the pipe connections between the operating and controlling parts, some of which have been described, may be briefly reviewed and completed as follows: A suitable fluid pressure (preferably air) is supplied to the system from any outside source by means of pipe 126 which extends through supporting post 100, and leads to the block 121 for applying fluid under pressure to the passage 125 of the NO valve and to passage 135 of the NC valve (Figures 12 and 13). A pressure pipe branch leads to a pressure switch PS (Figures 20 to 23) diagrammatically shown as an electrical connecting switch between conductors 240 and 241 as hereinafter described. A pipe connection 122 extends from the NO valve to the lower end of the diaphragm valve B, and a pipe connection 250 extends from the NC valve to the upper end of diaphragm valve A. A pipe connection 246 extends from the lateral opening passage 162 of diaphragm valve B to the upper ends of cover cylinders 55, and a piping connection 242 extends from the lower end of cylinders 55 and through pipe 243 to the lower end passage 164 of diaphragm valve A, the lateral opening passage 162 of diaphragm valve A being connected by a piping connection 244 with the motor valve pipe 232 as shown in Figure 17. This pipe 244 also has a pipe connection 245 with the upper or pressure end passage 181 of diaphragm valve B, and a check valve L is connected between pipes 250 and 243 leading to the top and bottom of diaphragm valve A by pipes 250 and an extension of pipe 243, the valve permitting a flow of pressure only in the direction from the pipe 250 through pipe 251 through the check valve and outwardly through pipe 243 (as represented in Figure 22).

A brake operating cylinder 91 is connected by a pipe 247 to the bottom opening 184 of the check valve T (Figure 19) with pipes 248 and 249 connected to the opposite upper openings 188, one pipe 248 extending into the pipe 246 leading to the upper end of cover cylinders 55 and the other pipe 249 connected into the pipe 250 leading to the upper end of the diaphragm valve A.

The various operating positions and conditions of the pressure and controlling parts are best understood from the foregoing detailed description of the parts and a detailed description of the various conditions described under "Operation."

*Electrical connections*

Figure 24:
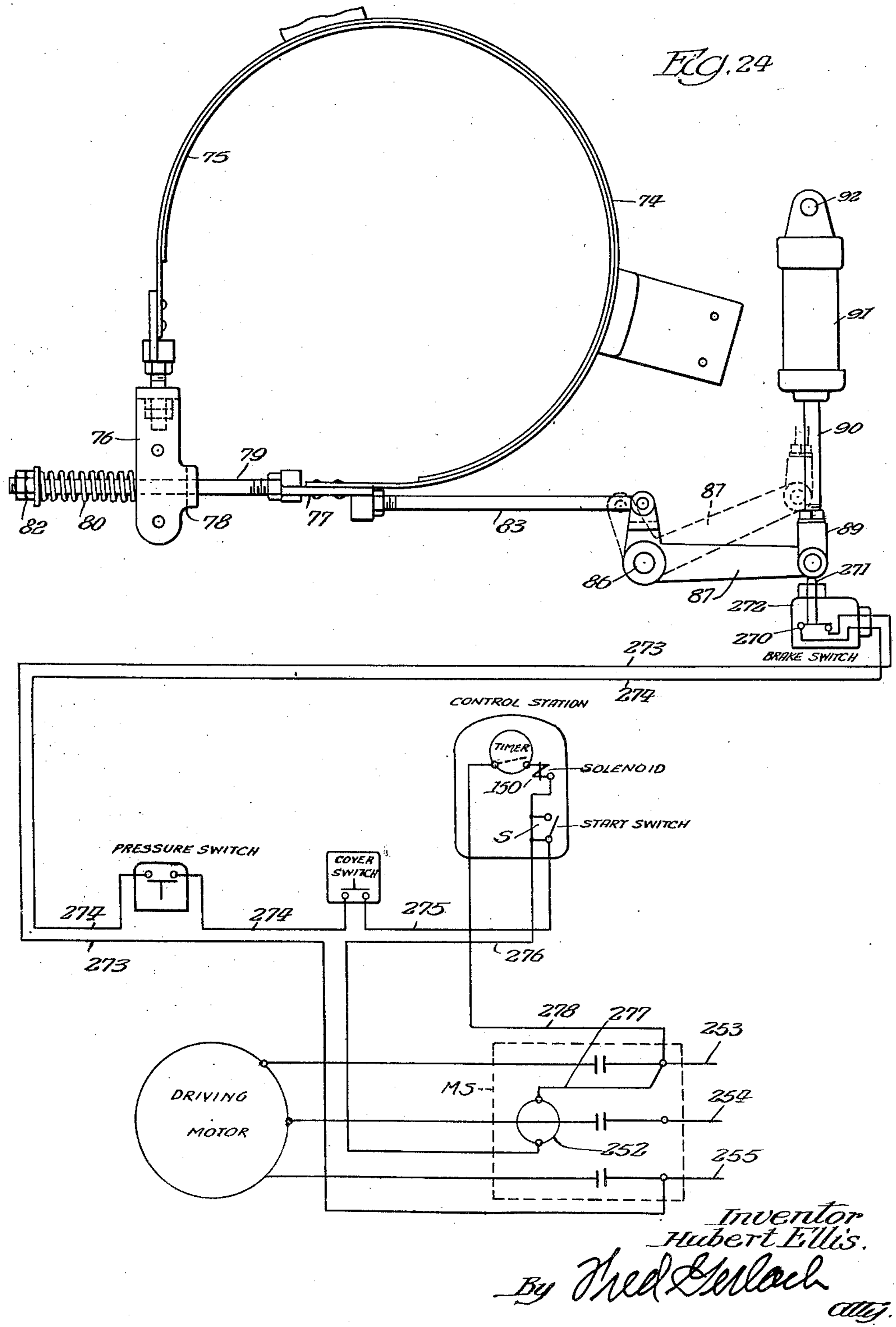
Figure 24 shows an electrical circuit insuring brake release before the driving motor can be started.

The basket of the extractor has an electric motor 193 connected thereto by a belt 196 for rotating it. The motor is represented in Figure 22 and Figure 24 as of the three phase type receiving current from supply lines 253, 254 and 255 through three main switches MS opened and closed by a contactor coil 252. This coil receives current from one of the supply lines through conductor 260, and conductors 259, 258, 257, and 256 form a series circuit therefrom through the cover switch pressure switch and the micro-switch back to one of the other mains 253 for energizing the contactor coil 252. If either of these switches is open, the contactor coil is not energized, the main switches MS are not maintained in closed position and the driving motor will not start or it will be stopped if started or running. The arrangement of Figure 24 adds a brake switch 270 in series with the others.

The micro-switch S is operated as a starting switch, in addition to which there is a clock-controlled timer including a switch 300 opened and closed thereby, and a solenoid 150 which are operated in starting, running, and to stop the mechanism as set forth in the four different positions as described in detail under "Operation."

*Operation*

The operation of the extractor and the system of coordinating the electric, air pressure, and mechanical operations is best understood from a consideration of the diagrammatic views Figures 20, 21, 22 and 23, in which the combined operation of the parts will also be understood from a consideration of the above detailed descriptions thereof.

The four principal conditions as shown in these figures are: (1) The stopped position in which the cover is closed, the brake is applied and the motor is off; (2) stopped position with the cover open, the brake released and the motor off; (3) running position, cover closed, brake released and motor running; (4) the slowing down position, motor circuit open, brake applied, cover closed.

In considering the diagrams, the fluid pressure connections are represented in black lines when the pressure is applied thereto, and in light parallel lines when no pressure is applied thereto, or the lines are vented. In Figures 20 to 23 inclusive which are diagrammatic representations of the system, the diaphragm valves A and B are inverted in position from their showing in the other figures, but the operations thereof are correctly described.

Figure 20:
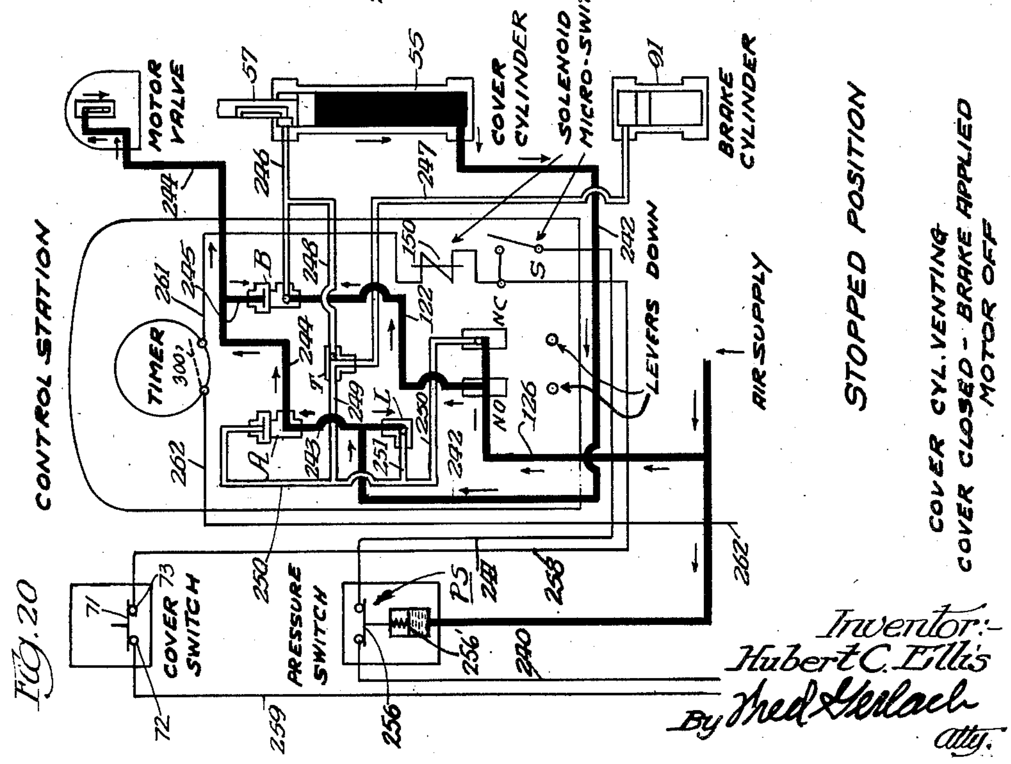
Figure 20 is a diagrammatic view illustrating the condition of the pneumatic and electrical operating parts with the apparatus stopped and the cover closed.

Referring now more particularly to Figure 20, showing the parts in the first position, the air supply line 126 leads directly to a pressure switch PS having a switch bar 256 actuated by a fluid pressure device 256′ normally receiving fluid under pressure from a branch of the air supply line 126. This switch is for connecting conductors 240 and 241 leading to the motor control circuit and insuring that the pressure must be adequate or the switch will not be closed. A supply pipe 126 leads directly to normally open valve NO and normally closed valve NC. The normally open valve is connected by a pipe 122 leading to one end of diaphragm valve B, but in this case, the ball valve of the diaphragm is closed by pressure on the diaphragm from the bottom of the cover cylinder through a pipe 242 which leads to a pipe 243 leading from a one-way check valve L to a diaphragm valve A and through the valve of diaphragm valve A through pipe 244 having a connection 245 extending to energize the diaphragm of valve B and thence the pipe 244 extending to the motor valve. Pressure being applied to the diaphragm of valve B closes the ball valve and prevents the top of the cover cylinder from receiving pressure through a pipe 246 and diaphragm valve B. Under these conditions, fluid pressure in the cover cylinder is venting from the bottom through the motor valve which is now opened by its governor and allows the cover cylinder to exhaust through pipes 242, 243, 244 and through the motor valve.

At this time, the NO and NC levers are down, the cover switch is closed, the brake cylinder is not receiving pressure because a pipe 247 which is connected to the three-way pressure valve T is not receiving pressure through a pipe 248 which is connected to the cover cylinder pipe 246 nor through a pipe 249 which is connected to a pipe 250 which extends from the diaphragm end of diaphragm valve A to the normally closed valve NC which also has a pipe connection 251 with the check valve L.

Thus it is seen that in this position the cover cylinder is venting, the cover remains closed, the brake is applied because the brake cylinder is not energized and the motor is shut off because the micro-switch S is open.

Figure 21:
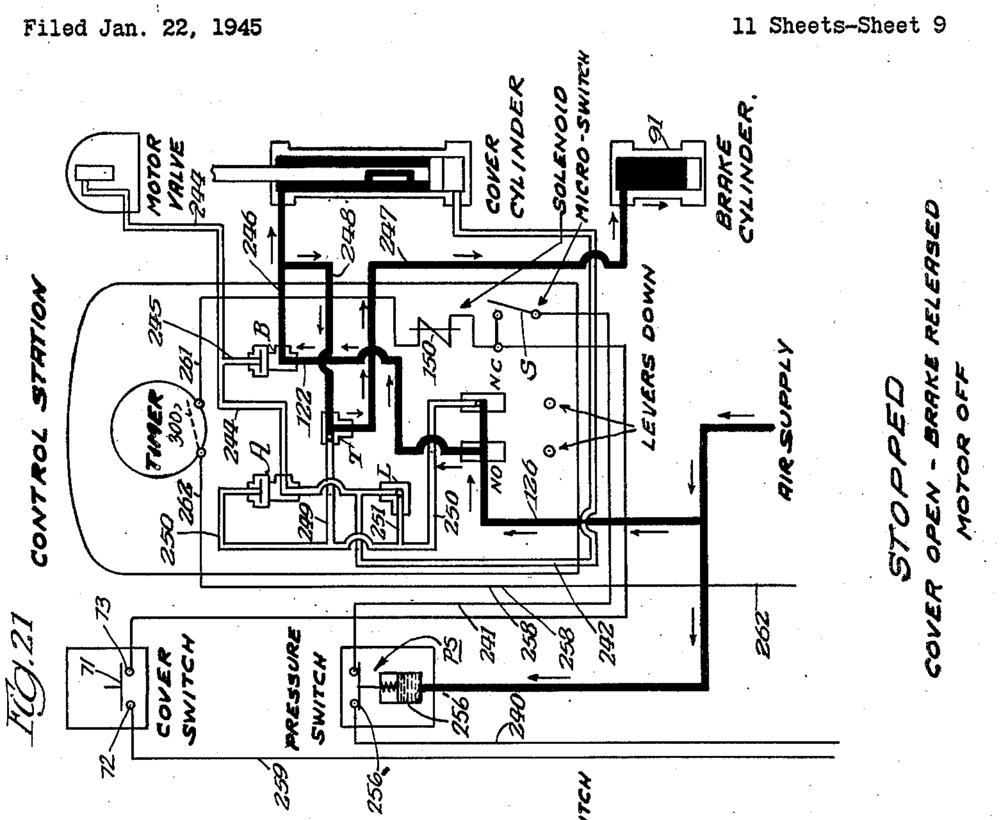
Figure 21 is a similar diagrammatic view of the controlling and operating parts when the machine is stopped and the cover is open.

*Second position.*—In this position as represented by Figure 21, the venting of the cover cylinder has been complete and since there is no pressure at the diaphragm end of the diaphragm valve B, the ball valve thereof is now open to admit pressure from pipe line 122 through the valve and through pipe 246 to the top of the cover cylinder, thereby operating the cover cylinder to raise or open the cover. This also allows pressure to flow from pipe 246 through pipe 248 into three-way valve T closing the ball thereof in one direction and allowing the pressure to be applied through pipe 247 to the brake cylinder, thus releasing the brake since the brake is applied by the pressure of its spring.

In this position, the motor is still deenergized and since the cover switch is open, the motor circuit cannot be closed until the cover is closed.

When the parts are in this position after a complete operation, the contents of the extractor are ready for unloading and since the brake is released, the extractor basket may be freely turned for unloading.

*Third position.*—In this position as represented by Figure 22, the extractor basket has been filled and balanced if necessary, the operator sets the timer on the control station panel, then raises both of the levers 96 and 97 which are represented in the up position. The operator is now free to do other work for the duration set by the timer and the machine automatically goes through the complete cycle of operations. Operation of the levers close the normally open valve NO and opens the normally closed valve NC. The upward movement of the levers also closes the micro-switch S for the motor circuit. Closing the NO valve vents the top of the cover cylinder through pipe 246 and diaphragm valve B and thence through the pipe 122 through the NO valve.

Pressure is applied to the bottom of the cover cylinder from the air supply through normally closed valve NC and thence through pipe 250 to the diaphragm of diaphragm valve A. This allows fluid under pressure to pass through check valve L and thence through pipe 243 closed by the ball valve of diaphragm valve A, but allows fluid under pressure to pass through the brake line 242 to the lower end of the cover cylinder, thereby operating its piston and closing the cover. As the cover closes, it automatically closes the cover switch, thus completing a maintaining circuit of a contactor coil 252 of a main switch MS through the micro-switch S and a pressure switch in series with the cover switch.

Since the pipe line 250 is receiving pressure at this time, the brake cylinder receives pressure through pipes 249 and 247 and also through the check valve T to release the brake.

The driving motor is represented as of the three-phase type receiving current from supply lines 253, 254 and 255. Connected to the supply lines is a contactor coil 252 for maintaining the energizing circuit from the supply lines through the main switch MS to the motor as follows: From main 253 through conductor 240, pressure switch, conductor 241, micro-switch S, conductor 258, cover switch, conductor 259, contactor coil 252 and conductor 260 to the other main 255. When the timer is operated, its circuit is also closed from the supply main 253 through micro-switch S as above described and thence through winding 150 of the solenoid, conductor 261, the timer, and conductor 262 back to the other supply main 255. This circuit is open, however, during the time that the extractor is set for operation because the operation of the timer is necessary to close the circuit.

The motor circuit is now held closed and the motor starts After the set running time has elapsed, the timer switch closes its circuit energizing the solenoid which trips the micro-switch S open. Opening the micro-switch breaks the maintaining circuit through the coil 252, thus opening the main switch connections MS for the supply line conductors 253, 254 and 255.

*Fourth position.*—Opening the micro-switch also breaks the solenoid energizing circuit for winding 150 so that the solenoid is only momentarily energized in the interval that its circuit is closed by the timer and then is opened by the micro-switch S. When the solenoid is energized, it also trips both valve levers 96 and 97 to a down position as represented in Figure 23 allowing the valves NO and NC to assume their normal conditions. In this condition, the motor has been cut off and the brake is applied. The normally closed valve NO vents the brake cylinder through check valve T and pressure pipes 247, 249 and 250, thus allowing the brake to be applied by its spring. The normally open valve NO opens the air supply to diaphragm valve B where it is checked by the trapped air in the line between the cover cylinder and the motor valve comprising the pipes 242, 243 and 244. As previously explained, when the motor slows down to a predetermined point, the governor in the motor valve opens a vent discharge for venting this line and also removing pressure from the diaphragm of diaphragm valve B as previously explained, thereby completing the entire cycle of operations.

*Brake release switch modification*

In Figure 24, a modification of the electrical controlling system is shown which requires that the brake must be released regardless of air or mechanical defects before the motor can be started.

To accomplish this result, a normally open brake switch 270 has a closing member 271 projecting from a casing 272 in which the switch is mounted, the member being in the path of operating arm 87 which is attached to the lower end of piston rod 90 of the brake cylinder 91. When the brake is applied, the arm is in raised position as shown in the broken outline, and when the brake is released, the arm is in the full line position as shown in Figure 24 engaging the switch closing member 271.

Connected by the switch are conductors 273 and 274, the first of which is connected directly to one of supply mains 255 and the other of which is connected to the pressure switch in series with the cover switch. From the cover switch, conductor 275 extends to the starting switch S and thence by way of conductor 276 to one side of contactor coil 252 of the main switch MS through the coil and through conductor 277 to another main line 253.

From the previous description, it is pointed out that the starting switch is closed by the operation of the control levers 96 and 97 which closes the starting switch for the starting operation.

The solenoid energizing circuit for the winding 150 is completed through the timer as set forth in the above description so that when the timer closes its circuit near the end of a run, this circuit is traced through the starting switch S as above set forth and thence through winding 150, the timer switch and conductor 278 to the other main supply line 253. Energizing the solenoid winding 150 opens the switch S which opens the maintaining circuit through the coil 252 of the switch MS, thus opening the main switch for the motor as above described.

Thus the operations of the extractor are the same as heretofore described except that an additional safety switch is provided in connection with the brake mechanism which insures that the brake must be entirely released to close the brake switch before the driving motor can be started to operate the extractor. This additional safety operation may be provided in connection with the cover switch and also the fluid pressure switch.

*Conclusion*

With this construction and operating system, the extractor is completely and automatically controlled by the combined operation of the various mechanical, electrical, and pressure devices together with their operating parts, electrical circuits and pressure lines so that it is necessary only to load the extractor, to set the timer, and to raise the operating levers. All of the various mechanical, electrical and pressure devices are operated in their proper sequence as above set forth until the timed operation is complete, the extractor is brought slowly to a complete stop and the cover is raised for unloading and to receive another load. Safeguards are also provided to prevent accidental operation of the motor or release of the brake unless the control levers 96 and 97 are operated.

The invention is not to be understood as restricted to the details set forth since these may be modified within the scope of the appended claims without departing from the spirit and scope of the invention.

Having thus described the invention, what I claim as new and desire to secure by Letters Patent is:

1. A centrifugal extractor having a rotatable container, a casing in which the container is rotatable, a raisable cover hinged to the casing, a motor for rotating the container, a fluid pressure device for opening and closing the cover, an electrical switch means connected to the cover for operation thereby to close the switch when the cover is closed, a fluid pressure supply for the fluid pressure device, a pressure operated electrical switch connected to the fluid pressure supply requiring a predetermined pressure of the supply before the switch is closed, and a control circuit for the motor including the cover switch and the pressure switch in series, the cover being closed before the control circuit for the motor can be established.

2. A centrifugal extractor, comprising a rotatable container, a casing in which the container is rotatable, a raisable cover for the casing, a motor for rotating the container, a fluid pressure cover operating device, a brake for stopping the carrier and a fluid pressure operating device for releasing the brake, a fluid pressure supply, and a pressure operated electrical switch in a control circuit for the motor connected to the fluid pressure supply, this switch requiring predetermined fluid under pressure to close the switch and the brake fluid pressure device requiring fluid under pressure to release the brake, an electrical cover switch having means connecting it to open with the cover and to close when the cover is closed, a manually operable electrical switch, and a control circuit for the motor including the manually operable switch, the pressure switch and the cover switch connected in series when they are closed so that the brake is released by its fluid pressure device and the cover is closed by its fluid pressure operated device before the motor can be energized.

3. A centrifugal extractor, comprising a rotatable container, a casing in which the container is rotatable, a cover raisable from the casing, an electric motor for rotating the container, a brake having a fluid pressure device for releasing it, a fluid pressure cover operating device, a fluid pressure supply connected to the fluid pressure brake and cover devices, an electrical switch and a fluid pressure operating device therefor connected to the fluid pressure supply and the switch operated thereby when there is sufficient pressure to actuate the fluid pressure devices, an electrical cover switch connected to and opened and closed when the cover is opened and closed respectively, a manually operable electrical switch, and an energizing circuit for the motor including the manually operable electrical switch, the pressure switch and the cover switch all connected in series when the switches are closed, and a timer including a switch and a circuit which is closed by the timer through the manually operable switch only when the latter is closed.

4. A centrifugal extractor having a rotatable container, a casing in which the container is rotatable, a cover raisable from the casing, a motor for rotating the container, a brake for stopping the container having a fluid pressure brake releasing device, a fluid pressure cover operating device for opening and closing the cover, a source of fluid pressure supply connected to the brake releasing and cover devices, an electric switch for the motor having a fluid pressure closing device operable when the pressure is sufficient to operate the other said fluid pressure devices, an electrical cover switch closed by the cover when the cover is closed, a timer having a normally open switch closed after the lapse of a predetermined time, a manually operable switch, a motor controlling circuit including the manually operable switch, the fluid pressure motor switch, and the cover switch in series to complete an energizing circuit for the motor, a solenoid winding included in a circuit with the timer switch, and a circuit breaker operated by the solenoid winding for opening the manually operable switch when it is closed in the motor circuit, the timer circuit being closed through the solenoid by the timer for operating the circuit breaker to open the manually closed switch circuit to the motor when a predetermined time set on the timer has expired.

5. In a centrifugal extractor, a pair of manually raisable operating levers, normally open valve means closed by one of the levers in its raising movement, normally closed valve means opened by the other lever in its raising movement, an operating rod moved by the levers, an electrical switch opened and closed by the rod in its opposite movements, a solenoid winding in a circuit including the switch and operable when energized to move the rod to open the switch and to lower the levers, a motor having a controlling circuit including the switch, a receptacle rotated by the motor, a casing for the receptacle having a raisable cover, fluid pressure cover operating means and fluid pressure brake operating means both receiving pressure through the normally closed valve means when the levers are raised, and the cover fluid pressure operating means being vented through the normally open valve means when its lever is raised.

6. In a centrifugal extractor, a pair of manually raisable operating levers, a source of fluid pressure supply, three way valve means normally open to said supply and closed therefrom when one of the levers is raised, another three way valve means normally closed to said supply and opened thereto when the other lever is raised, a receptacle and a motor for rotating it, a casing for the receptacle and a cover raisable therefrom, fluid pressure means comprising a cylinder and a double acting piston therein for raising and lowering the cover, fluid pressure brake operating means for the receptacle, means connecting the normally closed valve means to both of said fluid pressure means to lower the cover and to operate the brake when its lever is raised, and means to connect the lowering end of said cover operating cylinder to the normally closed valve means when its lever is raised, the three way valves having a pressure exhaust connection when they are closed to the passage of pressure therethrough by the operation of their levers.

7. In a centrifugal extractor, a source of fluid pressure supply, valve means normally open to said supply, another valve means normally closed to said supply, operating levers raisable to close the normally open valve means and to open the normally closed valve means to said supply, an extractor casing having a rotatable receptacle and a motor for rotating it, a cover raisable from said casing, double acting fluid pressure means comprising a cylinder and piston for raising and lowering cover of the receptacle, fluid pressure brake operating means for the receptacle, a fluid pressure connection from the normally closed valve means which is opened by its lever to the fluid pressure means for lowering the cover and to admit fluid under pressure to the fluid pressure brake means, a pair of diaphragm valves each controlled by pressure from one of the normally open and normally closed valves, and the normally open valve means being closed by its lever to connect the cover raising end of the fluid pressure cover cylinder to exhaust through one of the diaphragm valves, and the other diaphragm valve being operative by the normally closed valve means when its lever is operated to close the fluid pressure cover cylinder against exhaust from the cover lowering end of said fluid pressure cylinder.

8. In a centrifugal extractor, an electric driving motor, means for controlling the operation of the motor, said means comprising a pair of fluid pressure valve closing levers, fluid pressure devices operated by the levers for controlling the motor operation means by said levers, an energizing circuit for controlling the motor operation including a switch, a vertically movable rod and means actuated by the levers for moving the rod and closing the said switch and its circuit, a solenoid and a timer with a switch and a controlled winding for the solenoid in a circuit closed by the timer to actuate the rod to lower the levers and to actuate the motor switch to open the motor controlling circuit for a predetermined time.

9. In a centrifugal extractor, a pair of manually raisable fluid pressure valve operating levers, valves operated by the levers, fluid pressure devices operated by the valves controlled by said levers, a motor controlling circuit including a switch, a longitudinally movable operating rod for opening and closing the switch, a solenoid for operatively moving the rod in one direction, a timer having a switch in a controlling circuit for the solenoid, a pair of arms each engaged by the raising movement of one of said levers, a fitting at the bottom of the operating rod, and a pin insertable through said arms and said fitting for selectively engaging either one or both of the arms and either one or both of the levers engaging the corresponding arm or arms to move the rod in one direction and to be moved by the rod in the other direction of movement.

10. In a centrifugal extractor, a pair of diaphragm valves each having a pressure end and a ball valve for controlling a fluid pressure circuit connection therethrough, a motor governor relief valve connected through the ball valve of one diaphragm valve and to the pressure end of the other diaphragm valve, a fluid pressure opening and closing cover operator for the extractor comprising a cylinder connected at one end through the ball valve of said other diaphragm valve, a pair of levers and pressure valves operated thereby, a source of fluid under pressure connected through the valves of said levers, the connection from one of the valves leading to the pressure end of the first said diaphragm, and a connection from the other fluid pressure valve leading through the ball valve of the other diaphragm valve to the cover opening end of said cover operating cylinder, a fluid pressure brake operating means and a three-way check valve connected to the fluid pressure brake operating means for connecting said means either to the pressure line for the first diaphragm valve or to the motor governor relief valve leading from the opening end of the fluid pressure cover cylinder.

11. In a centrifugal extractor, a pair of diaphragm valves each having fluid pressure and ball valve means for controlling a fluid pressure path through the valve, a source of fluid pressure supply, valve means normally closed to said supply and connected to the pressure end of the first diaphragm valve, valve means normally open to said supply and connected through the ball valve of the second diaphragm valve, a double acting fluid pressure piston and cylinder cover opening and closing operating device for the extractor connected at the cover opening end to the ball valve of the second diaphragm valve, and connected at the cover closing end through the ball valve of the first diaphragm valve, a fluid pressure speed governor valve for the extractor connected through the ball valve of the first diaphragm valve and to the pressure end of the second diaphragm valve so that the cover operating device can discharge through the governor valve when the extractor speed reaches a predetermined low level, a fluid pressure brake operating means, and a three-way check valve connecting the brake operating means either to fluid pressure applied to the diaphragm end of the first valve or to a pressure relief through the check valve, the other end of the check valve being connected to the cover opening end of the fluid pressure cover operating device, and a motor for operating the motor valve having a brake operated by the fluid pressure brake device to release the brake.

12. A centrifugal extractor providing a rotatable perforated container, a casing in which the container is rotatable having a cover hinged at one side, an electric motor for rotating the container, fluid pressure means for raising and lowering the cover, a fluid pressure supply for said means to raise the cover, a governor operated by the motor, a fluid pressure relief valve actuated by the governor, pipe connections to the fluid pressure supply and to the fluid pressure means for the cover and also connected to the fluid pressure relief valve, the valve being opened by the governor and connected for venting when the motor is at rest and when the motor speed reaches a predetermined minimum after the operation thereof to insure that the cover will remain closed until the motor has stopped.

13. A centrifugal extractor comprising an electric motor, a carrier driven thereby, a brake for the carrier including a fluid pressure device for releasing the brake when pressure is applied thereto, coordinating fluid pressure and electrical means comprising an electrical energizing circuit for the motor, a switch in the circuit for controlling the motor and a second fluid pressure device requiring a predetermined pressure to close the switch, a source of fluid pressure supply for said fluid pressure devices, and means to apply the fluid pressure to the first fluid pressure device to release the brake before the electrical switch is closed by its fluid pressure device to energize the driving motor.

14. A centrifugal extractor comprising an electric motor, a rotary carrier driven thereby, a casing in which the carrier is rotatable, a cover raisable from the casing, a fluid pressure brake for stopping the carrier when pressure is released on the brake, a fluid pressure opening and closing device for the cover and for opening the cover when pressure is relieved from one end, a source of fluid pressure supply for the fluid pressure devices, a governor operated by the motor, a fluid pressure relief valve actuated by the governor, pipe connections to the fluid pressure supply and to the fluid pressure means for the cover and from one end of the cover to the said relief valve, the relief valve being opened by the governor and connected for venting the cover when the motor is at rest and when the motor speed reaches a predetermined minimum to insure that the cover will remain closed until the motor has stopped, and means to relieve pressure on the fluid pressure brake to apply the brake before the cover fluid pressure means is relieved of pressure to open the cover by operation of the governor relief valve by the motor.

15. A centrifugal extractor comprising a rotatable container, an electric motor for driving the container, a casing in which the container is rotatable, a brake for stopping the container including a fluid pressure operating device for applying the brake when fluid pressure is released, an electrical control circuit for the motor, a switch in the control circuit, a fluid pressure closing device for the switch, a source of fluid pressure supply for the fluid pressure brake device and for the fluid pressure switch closing device, a governor operated by the motor, means to admit fluid under pressure to the closing device for the switch to actuate the motor, and means to release the brake by applying fluid under pressure thereto before the fluid pressure device closes the switch for actuating the motor.

16. A centrifugal extractor having a rotatable container, a casing in which the container is rotatable, a cover raisable from the casing, a motor for rotating the container, a brake for stopping the container including a fluid pressure operating device to release the brake when under pressure, a fluid pressure cover operating device to open and close the cover, coordinating fluid pressure supply and electrical means comprising an energizing circuit for the motor, an electrical switch in the energizing circuit and a fluid pressure device for closing the switch, and governor means operated by the motor and including a valve having pipe connections to the cover operating device, the valve being opened by the governor and connected for venting when the motor is at rest and when the motor speed reaches a predetermined minimum after the operation thereof, means for supplying fluid under sufficient pressure to close the cover, and means to release the brake by its fluid pressure device before the switch closing fluid pressure device is operated to insure that the cover will remain closed until the motor has been stopped by the brake and to release the brake before the driving motor is actuated by the closure of its electrical switch by its fluid pressure device.

17. A centrifugal extractor having a rotatable container, a casing in which the container is rotatable, a cover hinged to the container, an electric motor for rotating the container, a fluid pressure device for opening and closing the cover, a spring applied brake for stopping the container comprising a fluid pressure device for releasing the brake spring when under pressure, a governor operated by the motor, a fluid pressure governor relief valve normally closed by the governor when the motor is running and opened when the motor slows down and having a pipe connected to said fluid pressure cover opening and closing device and operative to vent the device for opening the cover when the motor slows down, a source of fluid pressure supply for the fluid pressure devices, means for relieving pressure to the fluid pressure brake device to allow the spring to apply the brake the governor operated by the motor insuring a predetermined low speed in stopping the motor before the cover operating fluid pressure device can be operated under pressure to open the cover, and means for applying pressure to the fluid pressure brake device to release the brake before the driving motor is actuated in starting.

18. A centrifugal extractor having a rotatable container, a casing in which the container is rotatable, a cover hinged to the casing, a motor for rotating the container, a fluid pressure cover operating device to open and close the cover, a governor operated by the motor, a fluid pressure relief valve actuated by the governor and normally closed when the motor is running and opened when the motor slows down and having a pipe connection extending to said cover operating device, a spring applied brake for stopping the container comprising a fluid pressure device for releasing the brake spring when under pressure, a source of fluid pressure supply for the fluid pressure devices, an electrical switch and means in connection with the cover for opening and closing the switch when the cover is opened and closed, a control circuit for the motor including the electrical switch, the brake and cover operating fluid pressure devices comprising separate means to apply fluid under pressure thereto operative to release the brake and to maintain the cover closed when the motor is running, the governor insuring a predetermined low speed in stopping the motor before the cover can be operated by its fluid pressure relief valve to open the cover and to open the cover switch connected to the cover and thereby insuring that the cover is closed before the motor can be energized for operation in starting.

HUBERT C. ELLIS.

REFERENCES CITED

The following references are of record in the file of this patent:

UNITED STATES PATENTS

| Number | Name | Date |
|---|---|---|
| 655,536 | Willox | Aug. 7, 1900 |
| 1,202,890 | Prestwich | Oct. 31, 1916 |
| 1,203,567 | Bartholomew | Nov. 7, 1916 |
| 1,236,529 | Balzer | Aug. 14, 1917 |
| 1,531,844 | Colclough | Mar. 31, 1925 |
| 1,773,710 | Geldhof | Aug. 19, 1930 |
| 1,853,821 | Krantz | Apr. 12, 1932 |
| 2,169,260 | Lambach | Aug. 15, 1939 |
| 2,174,018 | Schaum | Sept. 26, 1939 |
| 2,261,936 | Johnson | Nov. 11, 1941 |
| 2,325,406 | Johnson | July 27, 1943 |